(12) United States Patent
van Rensburg et al.

(10) Patent No.: US 11,138,254 B2
(45) Date of Patent: Oct. 5, 2021

(54) AUTOMATING CONTENT RECOMMENDATION BASED ON ANTICIPATED AUDIENCE

(71) Applicant: RingCentral, Inc., Belmont, CA (US)

(72) Inventors: Christopher van Rensburg, Foster City, CA (US); Martin Arastafar, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/236,329

(22) Filed: Dec. 28, 2018

(65) Prior Publication Data

US 2020/0210469 A1 Jul. 2, 2020

(51) Int. Cl.
*G06F 16/435* (2019.01)
*G06F 16/438* (2019.01)
*G06F 40/166* (2020.01)
*G06F 40/242* (2020.01)
*G06F 16/335* (2019.01)

(52) U.S. Cl.
CPC .......... *G06F 16/435* (2019.01); *G06F 16/335* (2019.01); *G06F 16/337* (2019.01); *G06F 16/4393* (2019.01); *G06F 40/166* (2020.01); *G06F 40/242* (2020.01)

(58) Field of Classification Search
CPC ...... G06F 17/21; G06F 17/211; G06F 17/212; G06F 17/24; G06F 17/25; G06F 17/27; G06F 17/2705; G06F 17/2745; G06F 17/2765; G06F 3/0484; G06F 3/04845; G06F 16/435; G06F 16/436; G06F 16/4393; G06F 40/166; G06F 40/242; G06F 40/30; G06F 16/346; G06F 16/335; G06F 16/337

See application file for complete search history.

(56) References Cited

U.S. PATENT DOCUMENTS

| | | | |
|---|---|---|---|
| 9,741,258 B1* | 8/2017 | Chetlur | H04N 21/4532 |
| 10,733,225 B1* | 8/2020 | Cook | H04L 67/1076 |
| 2003/0082508 A1* | 5/2003 | Barney | G09B 5/00 434/308 |
| 2014/0101085 A1* | 4/2014 | Lu | G06N 5/02 706/46 |
| 2014/0244677 A1* | 8/2014 | Friedlander | G06F 17/2229 707/758 |
| 2015/0052440 A1* | 2/2015 | Livingston | G06F 3/04845 715/732 |
| 2016/0011729 A1* | 1/2016 | Flores | G06F 3/167 715/728 |
| 2016/0148524 A1* | 5/2016 | Pulido | G06F 16/951 434/353 |
| 2016/0259765 A1* | 9/2016 | Li | G09B 7/04 |
| 2016/0293036 A1* | 10/2016 | Niemi | G09B 7/04 |
| 2017/0068847 A1* | 3/2017 | el Kaliouby | H04N 21/251 |
| 2017/0372215 A1* | 12/2017 | Platt | G06F 16/245 |

(Continued)

*Primary Examiner* — Chau T Nguyen

(57) ABSTRACT

A computer-implemented method and system for improving digital content recommendations of a presentation is provided. The method comprises determining one or more knowledge areas covered by the presentation stored in a database; determining an audience proficiency level in the one or more knowledge areas based on audience data stored in the database; estimating a knowledge gap from the audience proficiency level and the presentation; and automatically generating a recommendation based, at least in part, on the knowledge gap.

24 Claims, 9 Drawing Sheets

(56) References Cited

U.S. PATENT DOCUMENTS

| | | | |
|---|---|---|---|
| 2018/0089156 A1* | 3/2018 | Kapoor | G06F 17/2288 |
| 2018/0196784 A1* | 7/2018 | Kumar | G06F 17/248 |
| 2018/0247116 A1* | 8/2018 | Chetlur | H04N 21/4722 |
| 2018/0286267 A1* | 10/2018 | Govil | G09B 5/12 |
| 2019/0121801 A1* | 4/2019 | Jethwa | G06F 16/3334 |
| 2019/0286890 A1* | 9/2019 | Khanna | G06F 3/0484 |
| 2019/0303655 A1* | 10/2019 | Werner | G09B 5/00 |
| 2020/0034606 A1* | 1/2020 | Sipolins | G06F 3/015 |

* cited by examiner

AUTOMATING CONTENT RECOMMENDATION BASED ON ANTICIPATED AUDIENCE

TECHNICAL FIELD

The present disclosure relates generally to the field of digital content analysis. Specifically, the present disclosure relates to systems and methods for automating content recommendations based on anticipated audiences.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

While preparing content for digital presentations, it is often difficult for presenters to anticipate whether their presentation content will be sufficiently comprehended by their audience. Presenters also often find it difficult to anticipate the types of questions that may be asked by particular audience members, depending on the audience member's level of proficiency in the content. This can lead to presentations that are less effective and/or presentations that prompt more questions from audiences both during and after the presentation.

Therefore, there is a need for preemptively evaluating presentation content against the composition of anticipated audiences to provide recommendations in advance of presentations.

SUMMARY

The appended claims may serve as a summary of the invention.

DETAILED DESCRIPTION

Figure 1:
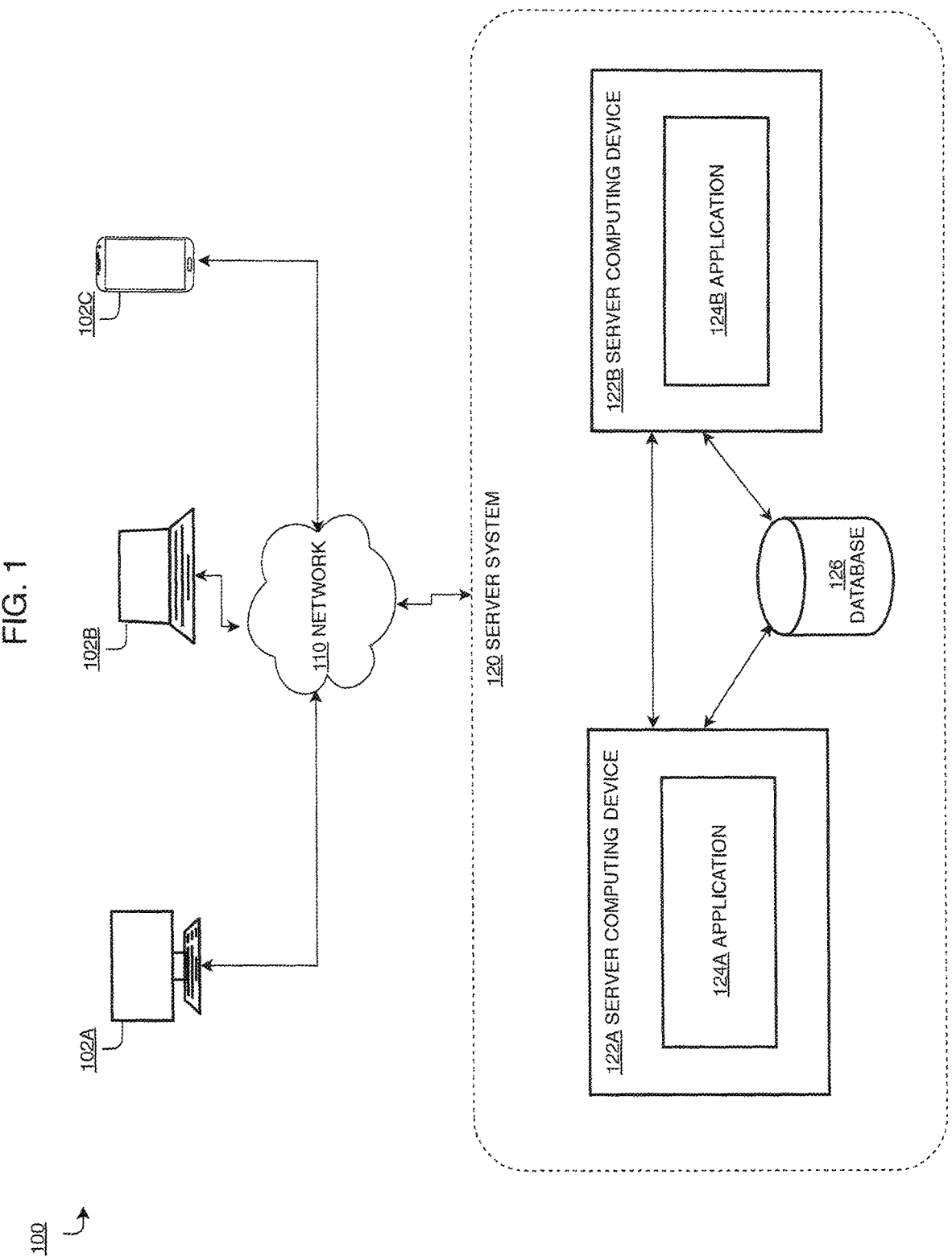
FIG. 1 illustrates a networked computer system, in an example embodiment.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form to avoid unnecessarily obscuring the present disclosure.

Embodiments are described in sections according to the following outline:

1.0 GENERAL OVERVIEW
2.0 STRUCTURAL OVERVIEW
3.0 FUNCTIONAL OVERVIEW
  3.1 Content Analysis Instructions
  3.2 Audience Analysis Instructions
  3.3 Knowledge Gap Estimation Instructions
  3.4 Audience Interest Satisfaction Prediction Instructions
  3.5 Presentation Feedback Instructions
    3.5.1 Forms of Feedback
      3.5.1.1 Overall Aggregate Scores
      3.5.1.2 Audience Member Aggregate Scores
      3.5.1.3 Audience Member Detailed Scores
      3.5.1.4 Knowledge Areas Aggregate Audience Scores
      3.5.1.5 Summarized List of Outlier Scores
    3.5.2 Remedial Actions
      3.5.2.1 Modifying Presentation Delivery
      3.5.2.2 Modifying Presentation Content
      3.5.2.3 Modifying Audience Composition
    3.5.3 Re-invoking Analysis After Modifications
  3.6 System Tuning Instructions
    3.6.1 Audience Member Survey
    3.6.2 Audience Member Questions
    3.6.3 Observed Expressions and Behaviors
4.0 PROCEDURAL OVERVIEW 1.0 General Overview Presenters often use standard presentation materials repeatedly for different audiences. For example, a neuroscientist may produce one lecture or presentation on neurodegenerative diseases. This presentation may be subsequently presented to audiences with a variety of compositions, such as: medical students, members of the general medical profession, other neurological experts, attendees of a healthful living educational course, attendees of a talk series, and so forth. However, each of these audiences has varying degrees of proficiency with the content of the presentation. For example, non-medical individuals that are taking a course on healthy living will generally know less about neurodegenerative diseases than neuroscientists doing research in the field.

Therefore, there is a need for a system and method that preemptively evaluates the topic and/or content of a presentation against the composition of the anticipated audience and provides recommendations for remedial actions in advance of the presentation. For example, the system may provide audience-specific tailored recommendations for the presenting neuroscientist prior to the presentation to optimize the presentation materials. If the audience has a lower proficiency in neurodegenerative diseases, for example, then the system and method can recommend decreasing the level of detail such that the presentation focuses on general concepts.

The disclosed embodiments relate to systems and methods for automatically generating presentation recommendations based on an anticipated audience. For example, for an audience of first year medical students, the system could indicate modest knowledge gaps for content of the presentation. As a result, the system recommends that the presenter maintain most of the content of their existing presentation while simplifying or reducing the amount of details modestly.

In another example embodiment, for an audience of a general symposium, the system could indicate substantial knowledge gaps for some anticipated audience members with regards to certain portions of the presentation content, but only moderate knowledge gaps for the remaining content. As a result, the system recommends that the presenter substantially simplify, or remove entirely, the content that would be most difficult to comprehend for most audience members while generally simplifying the remaining content.

In another embodiment, for an audience of practicing neurologists, the system could indicate no meaningful knowledge gaps for all the content of the presentation and a high degree of interested by the audience in general for certain portions of the presentation. As a result, the system can recommend that the presenter substantially expand on in-depth details with regards to the portions of the presentation that have the highest anticipated degree of interest.

The current disclosure provides a technological solution to the technological problem of wasted processing resources that would otherwise occur without tailored content recommendations. For example, a webinar presentation that is too detailed for a particular audience would result in an increase in online question submissions from a confused audience, which dramatically increases wasteful processing resources and excess network bandwidth usage. Therefore, the current solution provides the technological benefit of decreasing the use of processing resources and network bandwidth.

While the foregoing examples provide specific details, the examples are not intended to be limiting and any combination of recommendations may be made for any combination of audiences. In an embodiment, the system automatically applies the recommendations, as further discussed herein.

Embodiments of the present disclosure provide a system and method for improving digital content analysis and recommendations. In some embodiments, one or more knowledge areas covered by a presentation that is stored in a database is determined. An audience proficiency level in the one or more knowledge areas is determined based on audience data stored in the database. A proficiency gap is estimated using the audience proficiency level and the presentation. A recommendation is automatically generated based on the proficiency gap.

According to another example embodiment of the present disclosure, a non-transitory computer-readable medium stores a set of instructions. The instructions, when executed by a processor, causes determining one or more knowledge areas covered by a presentation stored in a database. The instructions also cause determining an audience proficiency level in the one or more knowledge areas based on audience data stored in the database. The instructions also cause estimating a proficiency gap using the audience proficiency level and the presentation, and automatically generating a recommendation based on the proficiency gap.

According to another example embodiment of the present disclosure, a system comprises a processor and a memory operatively connected to the processor. The memory stores instructions that, when executed by the processor, cause determining one or more knowledge areas covered by a presentation stored in a database. The instructions also cause determining an audience proficiency level in the one or more knowledge areas based on audience data stored in the database. The instructions also cause estimating a proficiency gap using the audience proficiency level and the presentation, and automatically generating a recommendation based on the proficiency gap.

In another embodiment of the present disclosure, a system can determine one or more knowledge areas covered by a presentation that is stored in a database, as well as an audience proficiency level based on accepted invitations and participant-related information stored in a user database. In some embodiments, the system can obtain historical information about previous presentation from a similar knowledge area that was presented to a similar audience and automatically generate recommendations to fill gaps in presentation materials based on questions asked by audience members during or after the historical presentation.

The foregoing and following descriptions are examples only and are not intended to limit the scope of the disclosure.

2.0 Structural Overview

FIG. 1 illustrates a networked computer system 100, in an example embodiment. In an embodiment, the networked computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

In the example FIG. 1, a networked computer system 100 facilitates the exchange of data between programmed computing devices. In an embodiment, the networked computer system 100 may be a system of computing devices configured to send, receive, and process digital presentation data and automatically generate a recommendation based on an anticipated audience. Therefore, each of elements 102A, 102B, 120, 122A, and 122B of FIG. 1 represents one or more computers that are configured to provide the functions and operations that are described further herein in connection with network communication. FIG. 1 illustrates only one of many possible arrangements of components configured to execute the programming described herein. Other arrangements may include fewer or different components, and the division of work between the components may vary depending on the arrangement. For example, while three client devices 102A, 102B, 102C are depicted in FIG. 1, communication can occur between or among any number of client devices.

Client device(s) 102A, 102B, 102C, are general or specialized computing devices, such as desktop computers, laptop computers, mobile smartphones, tablets, smartwatches, IoT devices, and so forth. Client device(s) 102A, 102B, 102C are configured to send presentations and/or presentation data to server computing device(s) 122A, 122B.

In an example embodiment, client device 102A is configured with a web browser that enables a digital upload of presentation data to a server computing device 122A, 122B. In another example embodiment, client device 102C is configured to execute a software application that enables a digital upload of presentation data to a server computing device 122A, 122B. Presentation data is, for example, all data associated with digital presentation slide files, all data associated with an audio and/or video file of a presentation, real-time streaming data associated with a live presentation, or any other type of data associated with presentations. Any combination of devices and applications may be implemented.

Network 110 broadly represents a combination of one or more local area networks (LANs), wide area networks (WANs), metropolitan area networks (MANs), global interconnected internetworks, such as the public internet, or a combination thereof. Each such network 110 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 110 and the disclosure presumes that all elements of FIG. 1 are communicatively coupled via network 110.

Server system 120 has one or more server computing device(s) 122A, 122B and one or more database(s) 126. Server computing device 122A, 122B is one or more server computing devices or server processes. In an example embodiment, server computing device 122A, 122B is implemented as one or more application servers that are programmed or configured to execute an application 124A, 124B. Application 124A, 124B is software that facilitates automated presentation evaluations and recommendations through a series of software application instructions. In an embodiment, application 124A, 124B includes embedded Application Programming Interface (API) calls from any number of partner applications.

Server computing device 122A, 122B are operatively connected to database 126. The database 126 represents one or more local or remote databases that store information pertaining to presentations and audiences. For example, the database 126 stores past presentation materials, list of audience questions associated with each of past presentation materials, current and/or future presentation materials, and the results of server analyses, as further described herein. In some embodiments, database 126 is configured as two separate databases for storing presentation materials and audience-related information. For example, one database may store a presentation slide set for a future presentation session while another database stores a list of anticipated attendees or audience members of the future presentation session. In another embodiment, database 126 is configured as three separate databases for storing presentation materials, audience-related information, and presenter-related information. For example, the presenter-related information can be security service data such as a username and password, or any other login information. While the foregoing presents specific examples of the number of databases, the examples are not intended to be limiting. Therefore, database 126 may be configured as any number of separate databases for storing any type of data.

3.0 Functional Overview

Figure 2:
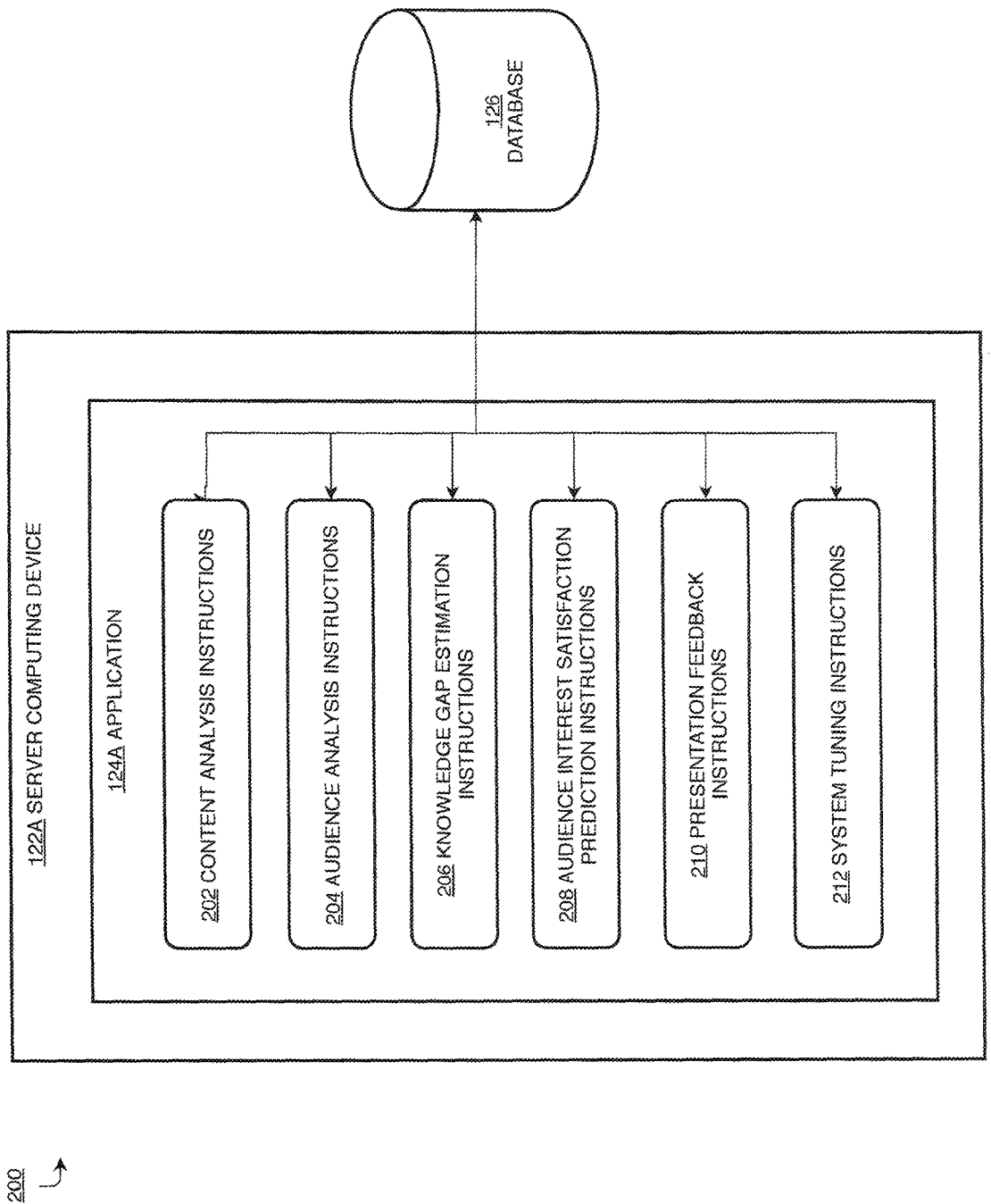
FIG. 2 illustrates a server analysis system, in an example embodiment.

FIG. 2 illustrates a server analysis system 200, in an example embodiment. As depicted in FIG. 1, the server analysis system 200 comprises one or more server computing device(s) 122A, 122B that executed one or more application(s) 124A, 124B. In the example embodiment of FIG. 2, one server computing device 122A is depicted. However, in some embodiments, server computing device 122B is used, while in other embodiments, a combination of both server computing devices 122A, 122B is used. Moreover, in the example embodiment of FIG. 2, one application 124A is depicted. However, in some embodiments, application 124B is used while in other embodiments, a combination of both applications 124A, 124B is used. While the foregoing presents specific examples of one or two server computing devices 122A, 122B and one or two applications 124A, 124B, any number of server computing devices may be used.

The application(s) 124A, 124B are configured with one or more sets of instructions. In the example of FIG. 2, the application 124A is configured with content analysis instructions 202, audience analysis instructions 204, knowledge gap estimation instructions 206, audience interest satisfaction prediction instructions 208, presentation feedback instructions 210, and system tuning instructions 212.

For illustration purposes, in the example of FIG. 2, each set of instructions is executed by one server computing device 122A. In another embodiment, the instructions are executed by multiple server computing devices 122A, 122B. For example, one server computing device 122A can execute a select number of instructions, such as the content analysis instructions 202, audience analysis instructions 204, knowledge gap estimation instructions 206, and the audience interest satisfaction prediction instruction 208, while another server computing device 122B executes the presentation feedback instructions 210 and system tuning instructions. In another embodiment, each set of instructions may be executed by a dedicated server computing device 122A, 122B. For example, content analysis instructions 202 are executed by a first server computing device, the audience analysis instructions 204 are executed by a second server computing device, the knowledge gap estimation instructions 206 are executed by a third server computing device, the audience interest satisfaction prediction instruction 208 are executed by a fourth server computing device, the presentation feedback instructions 210 are executed by a fifth server computing device, and the system tuning instructions 212 are executed by a sixth server computing device. Any number of server computing devices 122A, 122B can be used to execute any number of instructions.

In some embodiments, the content analysis instructions 202, audience analysis instructions 204, knowledge gap estimation instructions 206, audience interest satisfaction prediction instructions 208, presentation feedback instructions 210, and/or system tuning instructions 212 are capable of accessing information that is stored in database 126. For example, the content analysis instructions 202 accesses historical, current, and/or future presentation materials stored in database 126 to analyze the content of those presentation materials and store the results of the analysis in database 126. Audience analysis instructions 204 access audience-related information stored in database 126 to analyze knowledge areas and interest areas for an audience member or the audience as a collective and store the results of the analysis in database 126. Knowledge gap estimation instructions 206 access the results of the aforementioned analyses that are stored in database 126 to estimate one or more knowledge gaps and store the knowledge gap estimates in database 126. Audience interest satisfaction prediction instructions 208 access the results of the aforementioned analysis that are stored in database 126 to predict an interest satisfaction and store the interest satisfaction prediction in database 126. Presentation feedback instructions 210 access the knowledge gap estimates and interest satisfaction predictions that are stored in database 126 to generate a set of scores and subsequent remedial action recommendations. In an embodiment, the scores and the recommendations are also stored in database 126 for subsequent access. In another embodiment, when the recommendations are automatically applied to presentation materials, the edited or altered presentation materials are also saved in database 126.

3.1 Content Analysis Instructions

In an embodiment, the server computer device 122A, 122B executes an application 124A, 124B featuring a content analysis module or content analysis instructions 202. The content analysis instructions 202 analyze the content of a presentation for specific knowledge areas and produce a set of knowledge area specifiers or identifiers that detail the various knowledge areas that are addressed in the content of the presentation. In an embodiment, the content analysis instructions 202 analyze different sections of the presentation to distinguish between various knowledge areas and assign knowledge area specifiers.

Figure 3:
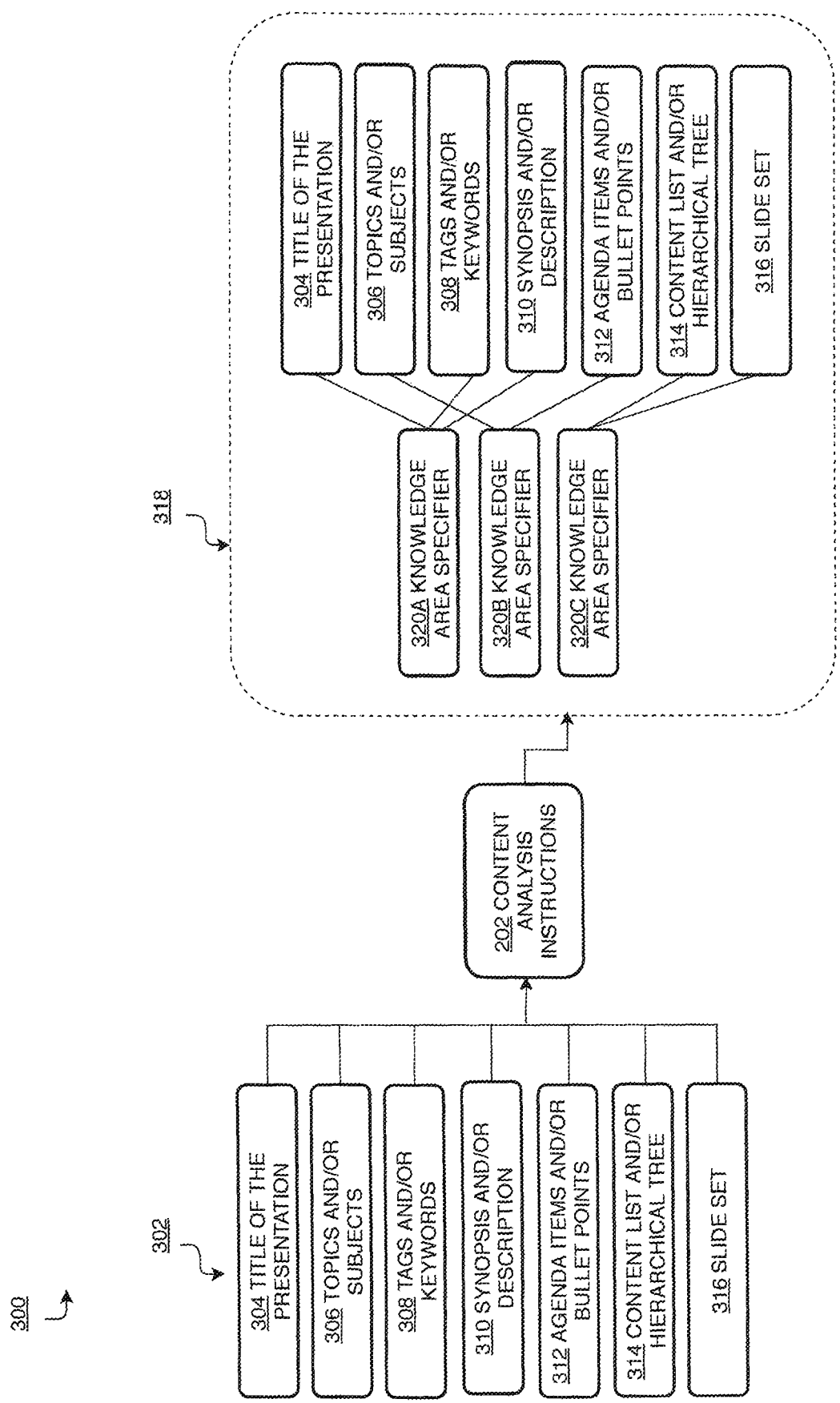
FIG. 3 illustrates a content analysis workflow, in an example embodiment.

FIG. 3 illustrates a content analysis workflow 300, in an example embodiment. In an embodiment, the content analysis instructions 202 accept a number of inputs 302, such as: the title of the presentation 304, a list of topics and/or subjects 306 covered in the presentation, a set of tags and/or keywords 308 that characterize aspects of the content, a synopsis and/or description 310 of the presentations content, a set of agenda items and/or bullet points 312 that detail the topics or subjects covered in the presentation, a content list and/or hierarchical contents tree 314 that details a sequential set of topics or subjects covered in the presentation, and/or a digital slide set 316 containing presentation content. While the foregoing provides a list of example inputs, the list is not intended to be limiting and may include any number of different types of inputs.

When the inputs lack specific presentation detail, such as when they are limited to general descriptions or a presentation title, the content analysis instructions 202 extrapolate a range of knowledge areas that will be covered during the presentation. In an example embodiment, machine learning techniques are used to extrapolate the knowledge areas. For example, the content analysis instructions 202 causes the server computing device 122A to access previous presentations, such as digital audio and/or video files of webinar recordings and/or digital presentation slide files, that are stored in a database 126 of FIG. 1 or FIG. 2 to use as machine learning training data. In an embodiment, the content analysis instructions 202 may identify relevant presentation data to use as training data. For example, the content analysis instructions 202 access previous presentation records from the same organization, the same department of the same organization, and/or the same presenter and use the relevant data from those records as training data for content analysis.

As a result of the analysis of the presentation content, the content analysis instructions 202 produce a set 318 of knowledge area specifiers 320A, 320B, 320C, mapped to the portion or aspect of the content from which the knowledge area was determined. For example, knowledge area specifiers can be mapped to a specific bullet point, a sentence in the description, a specific slide in a slide set, a specific bullet point in a specific slide in a slide set, and so forth. This set of knowledge area specifiers is then made available to subsequent analysis processes of the server system 120, such as those analysis processes performed by the separate knowledge gap estimation instructions 206 and the audience interest satisfaction prediction instructions 208. In an embodiment, the set of knowledge area specifiers are saved in database 126 associated with the server computing devices 122A, 122B for subsequent access by any of the instructions described herein.

3.2 Audience Analysis Instructions

The server computing device 122A, 122B may also execute an audience member analysis module or audience analysis instructions 204. The audience member analysis instructions 204 is responsible for performing an analysis of each of the audience members for the scheduled presentation in order to produce an assessment of each audience's proficiency, skill level, expertise, experience, familiarity, and/or interest in the various knowledge area(s) addressed by the content of the presentation, as determined by the content analysis instructions 202. In one embodiment, the audience analysis instructions 204 performs an analysis on each individual member of an audience, while in another embodiment it performs an analysis on the audience as a whole. In another embodiment, different subcategories of audience members may also be used for analysis.

Figure 4:
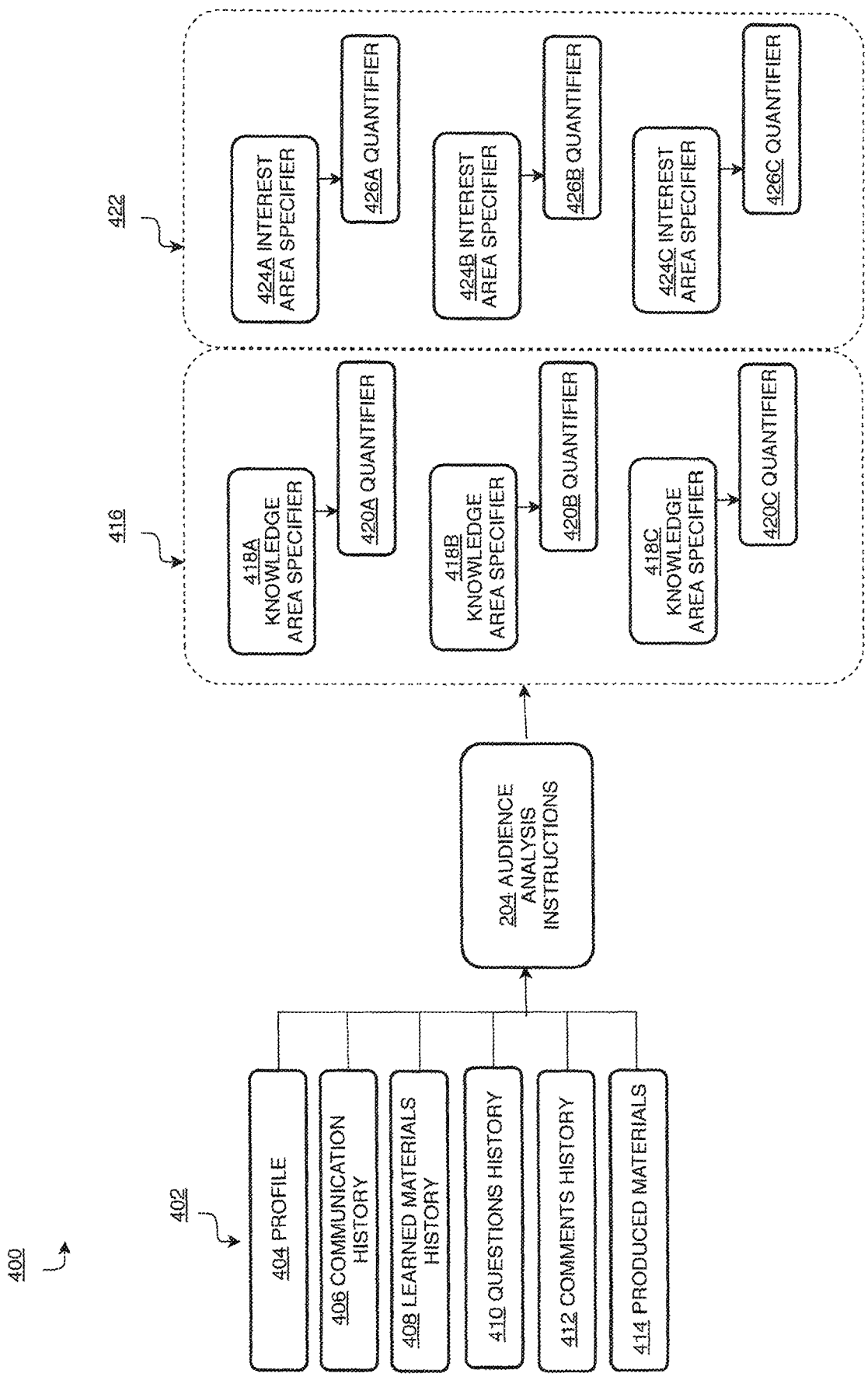
FIG. 4 illustrates an audience analysis workflow, in an example embodiment.

FIG. 4 illustrates an audience analysis workflow 400, in an example embodiment. The audience analysis instructions 204 accepts numerous inputs 402 upon which to perform its analysis. In some embodiments, the audience analysis instructions 204 accept an input 402 of attendance confirmations from audience members. For example, the server system 120 accepts an audience member's attendance information, such as a name, position title, e-mail address, physical address, and/or any other audience information from audience members that have signed up for a particular webinar presentation. This information is stored in database 126 for subsequent access by the audience analysis instructions 204. In some embodiments, the audience analysis instructions 204 uses, for example, the name and/or position title of confirmed attendees to acquire additional inputs 402 pertaining to that particular audience member. For example, the audience analysis instructions 204 may cross-reference an attending audience member's name with publicly available associated information, such as social media profile information, historic communication information, publication information, forum discussion information, and/or any other type of information.

For example, the audience analysis accepts a profile 404 of an audience member on a professional social network which describes employment history, job titles, projects, accomplishments, skills, education, and so forth. Another possible input 402 is a communication history 406 for the audience member for one or more communication services, such as chat and collaboration services, telephony services, email services, and so forth, where the communication history 406 shows the audience member asking questions related to certain knowledge areas, answering questions related to certain knowledge areas, or the audience member's inability to answer questions related to certain knowledge areas and/or providing inaccurate or poor answers to questions related to certain knowledge areas. Another possible input 402 is learned materials history 408, such as a history of books read, tutorials watched or read online, whitepapers read, presentations or talks watched online, conferences attended, questions asked or answered on online forums or services relating to certain knowledge areas.

Another possible input 402 is a questions history 410, such as a history of questions asked during past presentation sessions relating to certain knowledge areas. Another possible input 402 is a comment history 412 in a source control system as a part of implementing or making modifications to features of a system and indicating a level of proficiency with certain knowledge areas relating to the technology or aspects of a system being improved. Another possible input 402 is a history of produced materials 414, such as a history of writing, publishing, or modifying documents and/or articles in a corporate knowledgebase that address certain knowledge areas. While the foregoing provides a list of example inputs, the list is not intended to be limiting and may include any number of different types of inputs.

In some situations, information on each individual audience member may not be available and only broad characterizations may be made about the likely composition of the audience, as in the case of analyzing an anticipated audience physically attending a talk at an industry conference. In such a situation, the audience analysis instructions 204 analyzes an audience based on a set of one or more constructed personas, archetypes, aggregations and/or classes of audience members. For each of these approximations of real audience members, certain characteristics can be predicted based on the various types of inputs 402 previously described herein. For example, the audience physically attending a talk at an industry conference may be estimated to comprise 50 software engineers, 20 product managers, 10 engineering directors, 5 sales representatives, 5 recruiters, and so forth. Profiles may be defined in the server system 120 for each of these various classes of audience members.

As a result of the analysis of the audience members for a scheduled presentation, the audience analysis instructions 204 produce a set 416 of knowledge area specifiers 418A, 418B, 418C and/or a set 422 of interest area specifiers 424A, 424B, 424C. Each of the knowledge area specifiers 418A, 418B, 418C identifies a specific knowledge area along with one or more quantifiers 420A, 420B, 420C that describe the audience member's proficiency, skill level, expertise, experience, and/or familiarity with the identified knowledge area. In some embodiments, weights or scores are associated with each quantifier 420A, 420B, 420C. The weights or scores are within a scale corresponding to the proficiency level of the audience member. For example, a lack of knowledge may be indicated with a lower weight or score while a deeper proficiency in the topic may be indicated with a higher weight or score. Each of the interest area specifiers 424A, 424B, 424C identifies a specific interest area along with one or more quantifiers 426A, 426B, 426C that describe the degree and/or nature of the audience member's interest in the identified interest area. In some embodiments, weights or scores are associated with each quantifier 426A, 426B, 426C. The weights or scores are within a scale corresponding to the interest level of the audience member. For example, a lack of interest may be indicated with a lower weight or score while a deeper interest in the topic may be indicated with a higher weight or score. The quantifiers 420A, 420B, 420C associated with knowledge area specifiers 418A, 418B, 418C, as well as the quantifiers 426A, 426B, 426C associated with the interest area specifiers 424A, 424B, 424C can quantify, for example, the level of the audience member's interest, the depth of the audience member's interest, the depth of the audience member's existing knowledge related to that interest, the depth or level of detail of the content, the manner in which the content is presented or explained, and so forth.

In some embodiments, there may be overlap between the set 416 of knowledge area specifiers 418A, 418B, 418C and the set 422 of interest area specifiers 424A, 424B, 424C. For example, for an audience member, there may be knowledge area specifiers 418A, 418B, 418C describing their proficiency, skill level, expertise, experience, and/or familiarity with quantum mechanics, while the same audience member may also be assigned an interest area specifier 424A, 424B, 424C describing the nature or degree of their interest in quantum mechanics. However, for the same audience member, there may be an interest area specifier 424A, 424B, 424C describing the nature or degree of their interest in neurology, but no corresponding knowledge area specifier 418A, 418B, 418C describing their proficiency, skill level, expertise, experience, and/or familiarity with the subject of neurology, particularly if the audience member has an interest in the subject but no meaningful experience or familiarity with it.

In an embodiment, there may be an inexact overlap between: (1) the set 416 of knowledge area specifiers 418A, 418B, 418C and the set 422 of interest area specifiers 424A, 424B, 424C produced by the audience analysis instructions 204 for an audience member, and (2) the set 318 of knowledge area specifiers 320A, 320B, 320C produced from analysis of the content of a presentation by the content analysis instructions 202. In an embodiment, the audience analysis instructions 204 may produce additional knowledge area specifiers and interest area specifiers for an audience member not corresponding to any knowledge areas addressed by the content of a presentation. In an embodiment, the set of knowledge area specifiers and/or interest area specifiers are saved in database 126 associated with the server computing devices 122A, 122B for subsequent access by any of the instructions described herein.

3.3 Knowledge Gap Estimation Instructions

Figure 5:
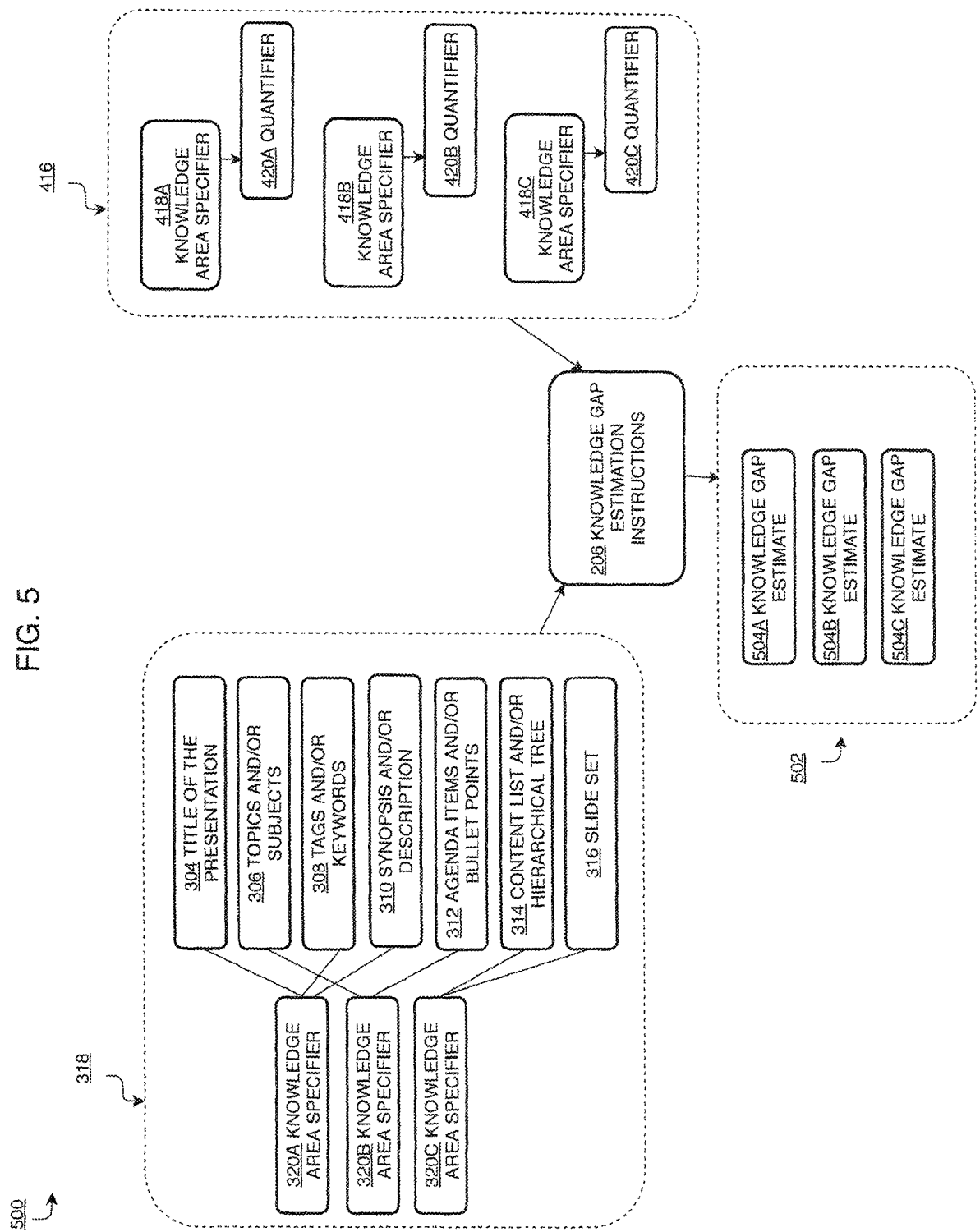
FIG. 5 illustrates a knowledge gap estimation workflow, in an example embodiment.

The server computing device 122A, 122B may also execute knowledge gap estimation instructions 206 for estimating audience knowledge gaps. FIG. 5 illustrates a knowledge gap estimation workflow 500, in an example embodiment. In an embodiment, the knowledge gap estimation instructions 206 is responsible for processing the outputs of the content analysis instructions 202 and the audience member analysis instructions 204 to produce a set 502 of knowledge gap estimates 504A, 504B, 504C for each audience member. Specifically, the knowledge gap estimates correspond to the various knowledge areas of the presentation content.

For example, if the presentation content for a presentation session has been determined to include the knowledge areas of cryptography, data center redundancy schemes, and C++ programming, and an Audience Member A is determined to have a knowledge area skill level of 5 out of 10 for cryptography, 9 out of 10 for data center redundancy schemes, and 2 out of 10 for C++programming, then the knowledge gap estimation instructions 206 may produce a knowledge gap estimate for Audience Member A reflecting a moderate knowledge gap for cryptography, a negligible knowledge gap for data center redundancy schemes, and a substantial knowledge gap for C++ programming.

In an embodiment, the knowledge gap estimation instructions 206 may further determine the estimation of an audience member's knowledge gaps for the various knowledge areas of the presentation content based on the knowledge gap estimation instructions' assessment of the depth of the specific content in each of the knowledge areas. For example, if the presentation content addressing cryptography does not have in-depth details and merely touches upon high-level, widely understood aspects of cryptography, then the knowledge gap estimate for the audience member A may be weighted down to only a minimal knowledge gap for that particular content of the presentation.

In an embodiment, there may be a partial or no overlap between the knowledge area specifiers produced by the content analysis instructions 202 and the knowledge area specifiers produced by the audience analysis instructions 204 for a given audience member. For example, the content of a presentation may address the knowledge areas of cryptography, data center redundancy schemes, and C++ programming, while the knowledge areas determined for a particular audience member may comprise network infrastructure scaling, data center redundancy schemes, data center power management protocols, and network threat detection systems. In this example, the overlap between the knowledge areas of the audience member and those addressed in the presentation is data center redundancy schemes. In such a case, the knowledge gap estimation instructions 206 may assume no level of knowledge in the knowledge areas of the presentation content for which no knowledge area specifiers are defined for the audience member. Therefore, the audience analysis instructions 204 may estimate a total or maximum knowledge gap for such knowledge areas. While the example herein specifies one particular method of estimating knowledge level and knowledge gaps, any other methods of knowledge level and gap estimations may be used.

As a result of the knowledge gap estimation, the knowledge gap estimation instructions 206 produces a set 502 of knowledge gap estimates 504A, 504B, 504C for an audience member. The knowledge gap estimates correspond to the various knowledge area specifiers that describe the contents of a presentation. The set 502 of knowledge gap estimates 504A, 504B, 504C is subsequently made available to the presenter feedback instructions 210, which provides the presenter with feedback, guidance, and/or recommendations on how best to tailor or adapt the presentation's content to reduce or eliminate these knowledge gaps. In an embodiment, the set 502 of knowledge gap estimates 504A, 504B, 504C are saved in database 126 associated with the server computing devices 122A, 122B for subsequent access by any of the instructions described herein. In another embodiment, the presenter feedback instructions 210 automatically applies recommendations to the presentation and/or takes other remedial action.

3.4 Audience Interest Satisfaction Prediction Instructions

The server computing device 122A, 122B may also execute audience interest satisfaction prediction instructions 208. The audience interest satisfaction prediction instructions 208 is responsible for predicting the degree to which the interest areas of an audience member are satisfied by the content in a presentation addressing those interests.

In an example embodiment, if a certain audience member attending a webinar has a keen interest in artificial intelligence based on the audience member's profile, and if the webinar contains content relating to artificial intelligence and addresses this interest area, then the audience interest satisfaction prediction instructions 208 will predict the degree to which the content related to artificial intelligence satisfies the audience member's interest. For example, if the content is superficial or contains excessively simplistic explanations for certain aspects of the subject, the audience interest satisfaction prediction instructions 208 will predict a low level of satisfaction in the content for the audience member. For an audience member who has only moderate interest in and minimal understanding of artificial intelligence, the audience interest satisfaction prediction instructions 208 will predict a high level of satisfaction in the content for that audience member.

Figure 6:
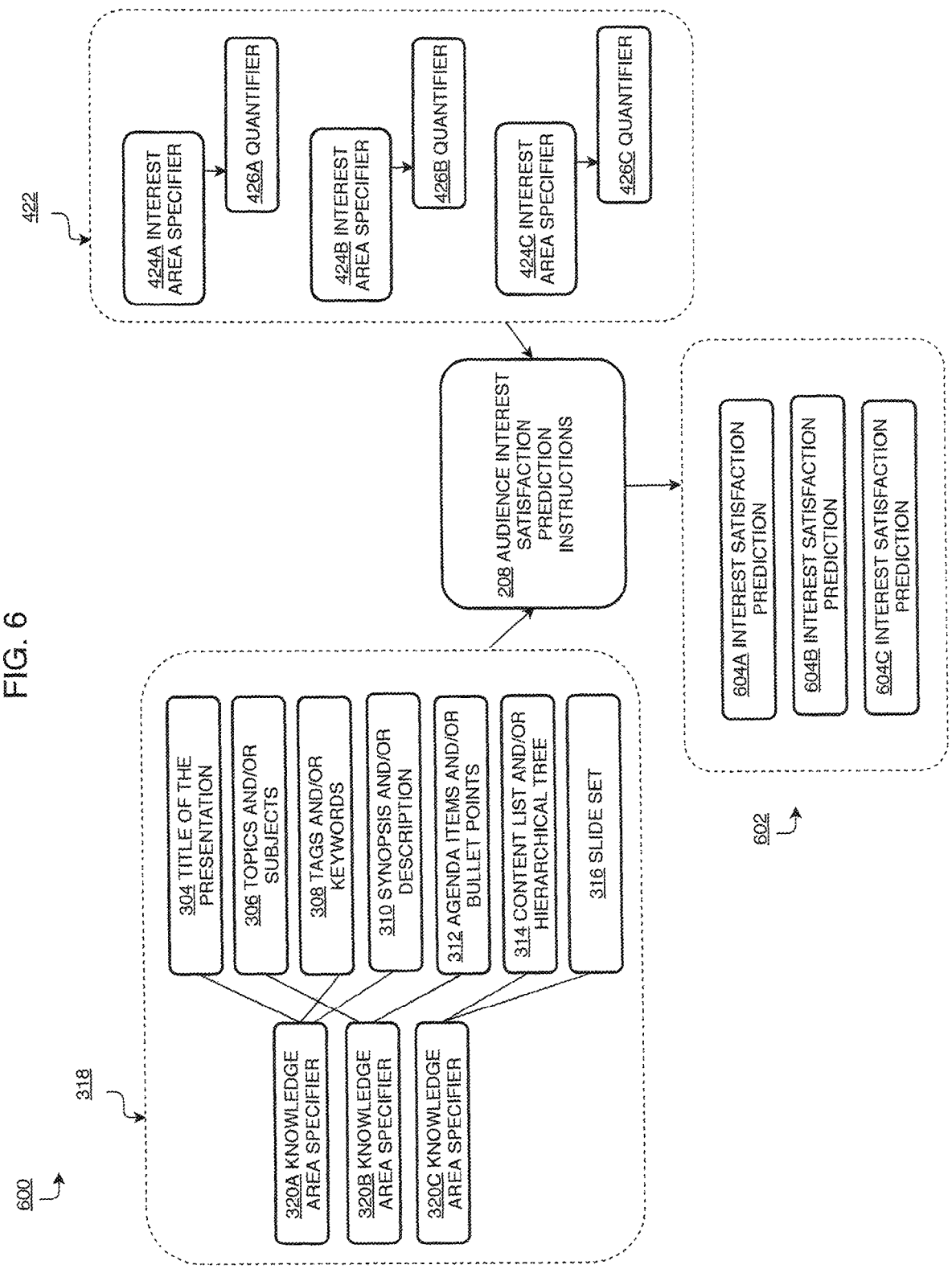
FIG. 6 illustrates an audience interest satisfaction prediction workflow, in an example embodiment.

FIG. 6 illustrates an audience interest satisfaction prediction workflow 600, in an example embodiment. In an embodiment, the audience interest satisfaction prediction instructions 208 predicts the interest satisfaction for an audience member by receiving at least two inputs. One input is the result of the analysis performed on the content of the presentation by the content analysis instructions 202, which describes the set 318 of knowledge area specifiers 320A, 320B, 320C addressed by the content of the presentation. Another input is the set 422 of interest area specifiers 424A, 424B, 424C for the audience member, as produced by the audience analysis instructions 204.

In an embodiment, the audience interest satisfaction prediction instructions 208 can iterate through the list of knowledge area specifiers 320A, 320B, 320C describing the content of the presentation, as produced by the content analysis instructions 202, and match some or all of the knowledge area specifiers 320A, 320B, 320C with interest area specifiers 424A, 424B, 424C describing the various interests of an audience member, as produced by the audience analysis instructions 204. Subsequently, the audience interest satisfaction prediction instructions 208 analyze the content of the presentation corresponding to these matches. For example, the audience interest satisfaction prediction instructions 208 analyze the content where a knowledge area addressed by the content matches with an interest area of the audience member, and then predict the degree to which the content will satisfy that interest, taking into account the level of the audience member's interest, the depth of the audience member's interest, the depth of the audience member's existing knowledge related to that interest, the depth or level of detail of the content, the manner in which the content is presented or explained, and so forth.

As a result of the prediction, the audience interest satisfaction prediction instructions 208 produce a set 602 of interest satisfaction predictions 604A, 604B, 604C of an audience member. In an embodiment, each interest satisfaction prediction 604A, 604B, 604C indicates the level to which an interest of the audience member that is addressed by the content of the presentation is satisfied by the various content in the presentation that addresses that interest. In an embodiment, the set 602 of interest satisfaction predictions 604A, 604B, 604C is made available to the presentation feedback instructions 210. In an embodiment, the set 602 of interest satisfaction predictions 604A, 604B, 604C is saved in database 126 associated with the server computing devices 122A, 122B for subsequent access by any of the instructions described herein. The presentation feedback instructions 210 subsequently provide the presenter with feedback, guidance, and/or recommendations on how best to tailor or adapt the presentation's content to increase interest satisfaction or take other remedial action. In another embodiment, the presenter feedback instructions 210 automatically applies recommendations to the presentation and/or takes other remedial action.

3.5 Presentation Feedback Instructions

The server computing device 122A, 122B may also execute presentation feedback instructions 210. The presentation feedback instructions 210 are responsible for providing the presenter with feedback, guidance, and/or recommendations on how best to tailor or adapt a presentation's content to reduce or eliminate knowledge gaps and increase interest satisfaction for audience members, or to take other remedial actions such as modifying the composition of the audience.

3.5.1 Forms of Feedback

Figure 7:
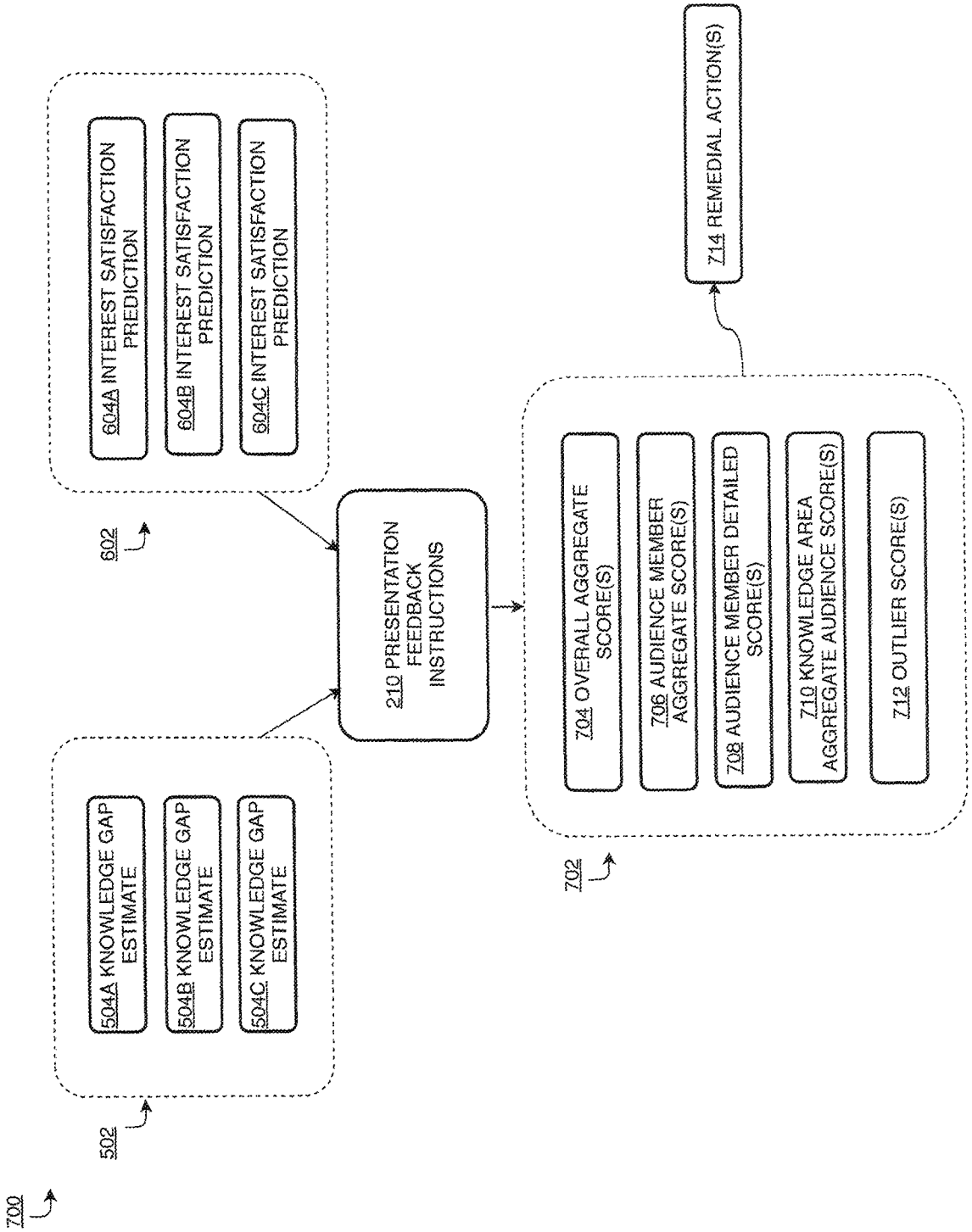
FIG. 7 illustrates a presentation feedback workflow, in an example embodiment.

FIG. 7 illustrates a presentation feedback workflow 700, in an example embodiment. The presentation feedback instructions 210 provides feedback 702 in numerous forms, some of which are described further herein. While specific examples of feedback are provided, any type of feedback in any combination may be provided. In an embodiment, each form of feedback may be stored in database 126 associated with the server computing devices 122A, 122B for subsequent access by any of the instructions described herein.

3.5.1.1 Overall Aggregate Scores

In an embodiment, overall aggregate scores 704 are provided as feedback 702, such as an overall comprehensibility and interest satisfaction score for the presentation content to a target audience. For example, the overall comprehensibility score is based on the aggregated knowledge gap estimates 504A, 504B, 504C for all audience members. When aggregating knowledge gap estimates 504A, 504B, 504C for audience members, knowledge gap estimates 504A, 504B, 504C for individual audience members may be weighted based on certain criteria such as a determination of importance for individual audience members to comprehend the presentation content. In another embodiment, knowledge gap estimates 504A, 504B, 504C may also be weighted based on the role, position, job title, and so forth of audience members within an organization. Any number of factors may be used to weigh the knowledge gap estimates 504A, 504B, 504C.

Similarly, in an embodiment, the overall interest satisfaction score is based upon the aggregate interest satisfaction predictions 604A, 604B, 604C for all audience members. For example, when aggregating interest satisfaction predictions 604A, 604B, 604C for audience members, interest satisfaction predictions 604A, 604B, 604C for individual audience members may be weighted based upon certain criteria, such as a determination of importance for individual audience members to have their interests satisfied by the presentation content. In another embodiment, interest satisfaction predictions 604A, 604B, 604C are weighted based on the role, position, job title, and so forth of audience members within an organization. Any number of factors may be used to weigh the interest satisfaction predictions 604A, 604B, 604C.

3.5.1.2 Audience Member Aggregate Scores

In another embodiment, audience member aggregate scores 706 are provided as feedback, such as a list containing aggregate scores for each audience member. For example, comprehensibility and interest satisfaction scores per audience member are aggregated for that audience member across all knowledge areas addressed by the content of the presentation. The aggregated comprehensibility score for an audience member is based upon an aggregation of the knowledge gap estimates 504A, 504B, 504C for the audience member for all knowledge areas addressed by the content of the presentation. The aggregated interest satisfaction score for an audience member is similarly based on an aggregation of the interest satisfaction predications 604A, 604B, 604C for the audience member for all knowledge areas addressed by the content of the presentation.

3.5.1.3 Audience Member Detailed Scores

In another embodiment, audience member detailed scores 708 are provided as feedback. The audience member detailed scores 708 may be, for example, a set of detailed scores for each audience member, such as a set of comprehensibility scores and a set of interest satisfaction scores for all knowledge areas addressed by the content of the presentation. The set of comprehensibility scores is based on the knowledge gap estimates 504A, 504B, 504C for the audience member for all knowledge areas address by the content of the presentation. The set of interest satisfaction scores is based on the interest satisfaction predications 604A, 604B, 604C for the audience member for all knowledge areas addressed by the content of the presentation.

3.5.1.4 Knowledge Areas Aggregate Audience Scores

In another embodiment, a list of aggregate audience scores 710 for each of the knowledge areas addressed by the content of the presentation is provided as feedback. The aggregate audience score may be, for example, a set of aggregate audience comprehensibility scores and a set of aggregate audience interest satisfaction scores for all knowledge areas addressed by the content of the presentation. The set of comprehensibility scores for the knowledge areas addressed by the content of the presentation is based on an aggregation of knowledge gap estimates 504A, 504B, 504C for all audience members corresponding to each of the knowledge areas addressed by the content of the presentation. The set of interest satisfaction scores for the knowledge areas addressed by the content of the presentation is based on an aggregation of the interest satisfaction predictions 604A, 604B, 604C for all audience members corresponding to each of the knowledge areas addressed by the content of the presentation.

3.5.1.5 Summarized List of Outlier Scores

In another embodiment, a set of outlier scores 712 containing different types of outliers is provided as feedback. For example, one of the different types of outliers covers certain audience members whose aggregate comprehensibility scores are exceptionally low or exceptionally high when compared to the overall comprehensibility score for the entire audience. In another embodiment, an outlier covers certain audience members whose aggregate interest satisfaction scores are exceptionally low or exceptionally high when compared to the overall interest satisfaction score for the entire audience. In another embodiment, an outlier covers certain knowledge areas addressed by the content of the presentation where the aggregate audience comprehensibility scores are exceptionally low or exceptionally high when compared to the overall aggregate comprehensibility score for the presentation in its entirety. In another embodiment, an outlier covers certain knowledge areas addressed by the content of the presentation where the aggregate audience interest satisfaction scores are exceptionally low or exceptionally high when compared to the overall aggregate interest satisfaction score for the entire presentation.

In another embodiment, an outlier covers certain audience members whose comprehensibility scores are exceptionally low or exceptionally high for specific knowledge areas addressed by the content of the presentation when compared to the aggregate audience comprehensibility score for that same knowledge area. In another embodiment, an outlier covers certain audience members whose interest satisfaction scores are exceptionally low or exceptionally high for specific knowledge areas addressed by the content of the presentation when compared to the aggregate audience interest satisfaction score for that same knowledge area. In another embodiment, an outlier covers an exceptionally low overall aggregate interest satisfaction score for the presentation as compared to an exceptionally high overall aggregate comprehensibility score for the presentation.

3.5.2 Remedial Actions

Any number of remedial actions 714 may be taken in response to feedback 702 provided by the presentation feedback instructions 210. Some remedial actions 714 may be explicitly recommended and/or facilitated by the presentation feedback instructions 210, such as the removal of certain audience members from the audience, and/or automatically removing content from or adding content to the set of presentation slides based on results from any of the analyses described herein.

3.5.2.1 Modifying Presentation Delivery

A presenter can respond to feedback 702 provided by the server system 120 by adjusting their expectations as to how their presentation may be received by the audience and modify aspects of presentation delivery accordingly. In an embodiment, the server system 120 may generate automatic notifications to advise presenters to proceed with the presentation delivery in a certain manner.

For example, when the server system 120 generates a feedback 702 that the overall aggregate comprehensibility score is high for the content of the presentation while the overall aggregate interest satisfaction score is low, the server system 120 may generate a notification that recommends that the presenter move through the presentation quickly and make an effort to deliver the content in an animated and engaging way so as to minimize the extent to which the audience may become bored with the presentation.

In another embodiment, when the server system 120 generates a feedback 702 that the overall aggregate comprehensibility score is low for the content of the presentation while the overall aggregate interest satisfaction score is high, the server system 120 may generate a notification that recommends that the presenter move at a slower pace through the presentation to give the audience more time to process the information being presented. The server system 120 may also generate a notification that recommends that the presenter should seek to speak in a clear and articulate manner and/or provision a special allowance for questions during the presentation rather than requiring that questions only be asked at the end of the presentation.

In an embodiment, the presenter may choose to make modifications to their delivery of a presentation across all the knowledge areas addressed based on the overall aggregate scores 704 provided as part of the server system 120's feedback to the presenter. In another embodiment, the presenter may choose to make modifications to their delivery just for certain knowledge areas addressed based on knowledge area aggregate audience scores 710 provided as part of the server system 120's feedback to the presenter.

3.5.2.2 Modifying Presentation Content

A presenter can respond to the feedback 702 provided by the server system 120 by making modifications to the content of the presentation to accord with the proficiency of the audience. For example, based on the feedback 702, the presenter may decide that an abridged, or a more in-depth treatment of the subject matter, may be warranted. Accordingly, the feedback 702 may dictate the length or duration of the presentation.

For instance, when the server system 120 generates a feedback 702 that the overall aggregate comprehensibility score is high for the content of the presentation while the overall aggregate interest satisfaction score is low, the presenter may modify the content of the slides used in the presentation by adding more detail, increasing the technical nature of the content, expanding the content that had previously been condensed in a single slide into multiple slides, adding humor or illustrations to make the presentation less boring to the audience, and so forth. In an embodiment, the server system 120 may automatically implement one or more of these recommended changes and present the changes to the presenter for review. For example, the server system 120 can automatically include illustrations into the presentation slides and track these changes for presenter review.

In an embodiment, when the server system 120 presents feedback 702 that the overall aggregate comprehensibility score is low for the content of the presentation while the overall aggregate interest satisfaction score is high, the presenter may modify the content of the slides used in the presentation by adding more explanations, removing unnecessary technical details, or otherwise modifying them to increase ease of understanding for the audience. In an embodiment, the presenter may choose to completely remove certain slides, remove certain bullet points from certain slides, add further bullet points to certain slides, add additional labels to certain diagrams, modify labels of certain diagrams to clarify or disambiguate their meaning, remove certain elements from diagrams, and so forth. In an embodiment, the server system 120 may automatically implement one or more of these recommended changes and present the changes to the presenter for review. For example, the server system 120 can automatically delete certain presentation slides and track these changes for presenter review.

In an embodiment, the presenter may choose to make modifications to the content of the presentation across all the knowledge areas addressed by the content of the presentation based on overall aggregate scores provided as part of the server system's feedback to the presenter. In another embodiment, the presenter may choose to make modifications to the content for a part of the knowledge areas addressed by the content of the presentation, based on knowledge area aggregate audience scores provided as part of the server system's feedback to the presenter. In some embodiments when the server system 120 applies recommended changes automatically, the presenter can choose to accept or reject all changes or some changes.

3.5.2.3 Modifying Audience Composition

In an embodiment, the presenter may respond to feedback 702 provided by the server system 120 by making modifications to the composition of the audience for a presentation. In an embodiment, the server system 120 may generate a recommendation for removing certain members from the audience and/or adding other members to the audience. For example, the server system 120 may provide a suggestion of removing certain audience members, adding certain audience members, or substituting some audience members for others based on suitability.

Audience members corresponding to certain outlier scores may be suggested for removal from the audience. In an embodiment, audience members whose aggregate comprehensibility scores are exceptionally low when compared to the overall comprehensibility score for the entire audience, such that they may find the presentation confusing, may be suggested for removal. In another embodiment, audience members whose aggregate interest satisfaction scores are exceptionally low when compared to the overall interest satisfaction score for the entire audience, such that they may find the presentation uninteresting or boring, may also be suggested for removal.

In an embodiment, the server system 120 may automatically send notifications to these audience members with outlier scores suggesting that different presentations may be better suited for each of those members. In another embodiment, the server system 120 may automatically remove these audience members with outlier scores from the audience list.

3.5.3 Re-invoking Analysis After Modifications

A presenter may, upon making any modifications either to the content of the presentation or the audience, re-invoke the server system's evaluation and be presented with fresh feedback. In an embodiment, re-invoking the system's evaluation also generates a convenient assessment of what the key differences are between the feedback for the previous version and the feedback for the modified version. In some embodiments, the feedback is reduced to a simple quantitative metric, such as an effectiveness score, which allows a presenter to easily conclude whether the modifications made are improving this effectiveness score.

3.6 System Tuning Instructions

Figure 8:
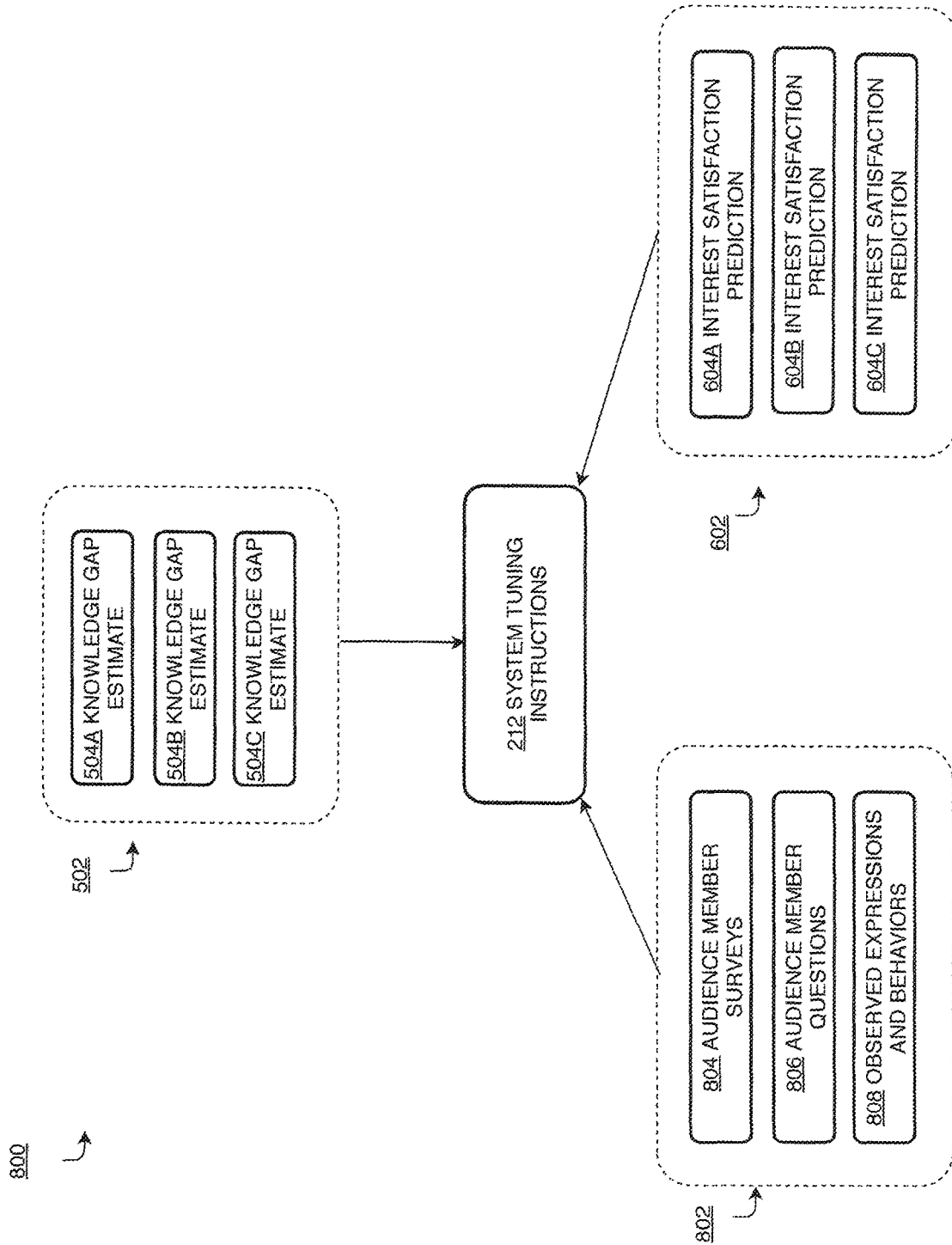
FIG. 8 illustrates a system tuning workflow, in an example embodiment.

FIG. 8 illustrates a system tuning workflow 800, in an example embodiment. The system tuning module or system tuning instructions 212 is responsible for tuning the overall server system 120 by reconciling the actual behavior of audience members during a presentation session with the behaviors of the various other instructions of the system. In an embodiment, the system tuning instructions 212 obtains a set 802 of audience data related to the presentation, such as audience member surveys 804, audience member questions asked 806 during or after the presentation, and observed expressions and behaviors of audience members 808 during the presentation. The system tuning instructions 212 subsequently compares this audience data with the set 502 of knowledge gap estimates 504A, 504B, 504C and the set 602 of interest satisfaction predictions 604A, 604B, 604C to tune the system.

3.6.1 Audience Member Surveys

In an embodiment, the server system 120 employs the use of audience member surveys 804 that are completed by audience members. Audience members use these surveys 804 to rate their ability to understand the various knowledge areas addressed by a presentation, the manner in which they were presented, as well as the degree to which the various knowledge areas addressed by a presentation satisfied their interest in those knowledge areas. The system then reconciles these assessments by audience member with the knowledge gap estimates 504A, 504B, 504C and interest satisfaction predictions 604A, 604B, 604C as produced by the knowledge gap estimation instructions 206 and audience interest satisfaction prediction instructions 208, respectively.

3.6.2 Audience Member Questions

In some embodiments, the server system 120 performs an analysis of audience member questions 806 posed to the presenter of a presentation session. The questions may have been asked during the presentation at the time which the content to which the questions are addressed is being presented. The questions may also have been asked at the end of the presentation session as part of a dedicated question and answer session. The system tuning instructions 212 determines cases where aspects of the presentation content were unclear, confusing, or insufficiently detailed for audience members. From the determination the system tuning instructions 212 reconcile this demonstrated real knowledge gap or unsatisfied interest relating to the content for various audience members with the initial knowledge gap estimates 504A, 504B, 504C and interest satisfaction predictions 604A, 604B, 604C as produced by the knowledge gap estimation instructions 206 and audience interest satisfaction prediction instructions 208, respectively. Therefore, the system tuning instructions 212 better tune the estimates and predictions made by these modules or instructions for future instances when the server system 120 is employed.

3.6.3 Observed Expressions and Behaviors

In some embodiments, the system performs an analysis of the facial expressions, verbal utterances, or other behaviors of audience member 808 during a presentation. In an embodiment, the system tuning instructions 212 utilize the video and/or audio streams of the audience members during a live webinar, for example, so as to determine instances where aspects of the presentation content were unclear, confusing, or unsatisfying for audience members. From this determination, the system tuning instructions 212 reconcile the demonstrated dissatisfaction or satisfaction relating to the content for various audience members with the initial knowledge gap estimates 504A, 504B, 504C and interest satisfaction predictions 604A, 604B, 604C as produced by the knowledge gap estimation instructions 206 and audience interest satisfaction prediction instructions 208, respectively. Therefore, the system tuning instructions 212 better tune the estimates and predictions made by these modules or instructions for future instances when the server system 120 is employed.

In an example embodiment, the server system 120 initially estimates an audience member to have a deep knowledge of an interest in a specific knowledge area and estimates that a presentation is of a quality and level of detail that should be comprehensible to the audience member and satisfy their level of interest in the knowledge area. However, when exposed to content in the presentation that addresses that knowledge area, the audience member is observed to scowl, contort their face, and verbally indicate confusion. Based on these expressions and behaviors, the server system 120 concludes that the initial knowledge gap estimates 504A, 504B, 504C and interest satisfaction predictions 604A, 604B, 604C as produced by the knowledge gap estimation instructions 206 and audience interest satisfaction prediction instructions 208, respectively, were incorrect. As a result, the system tuning instructions 212 refine the behavior of these instructions or the audience analysis instructions 204. In an embodiment, the system tuning instructions 212 adds this data to machine learning training data for the specific audience member to produce better estimates and predictions for the audience member for future presentation sessions to which they may be invited.

4.0 Procedural Overview

Figure 9:
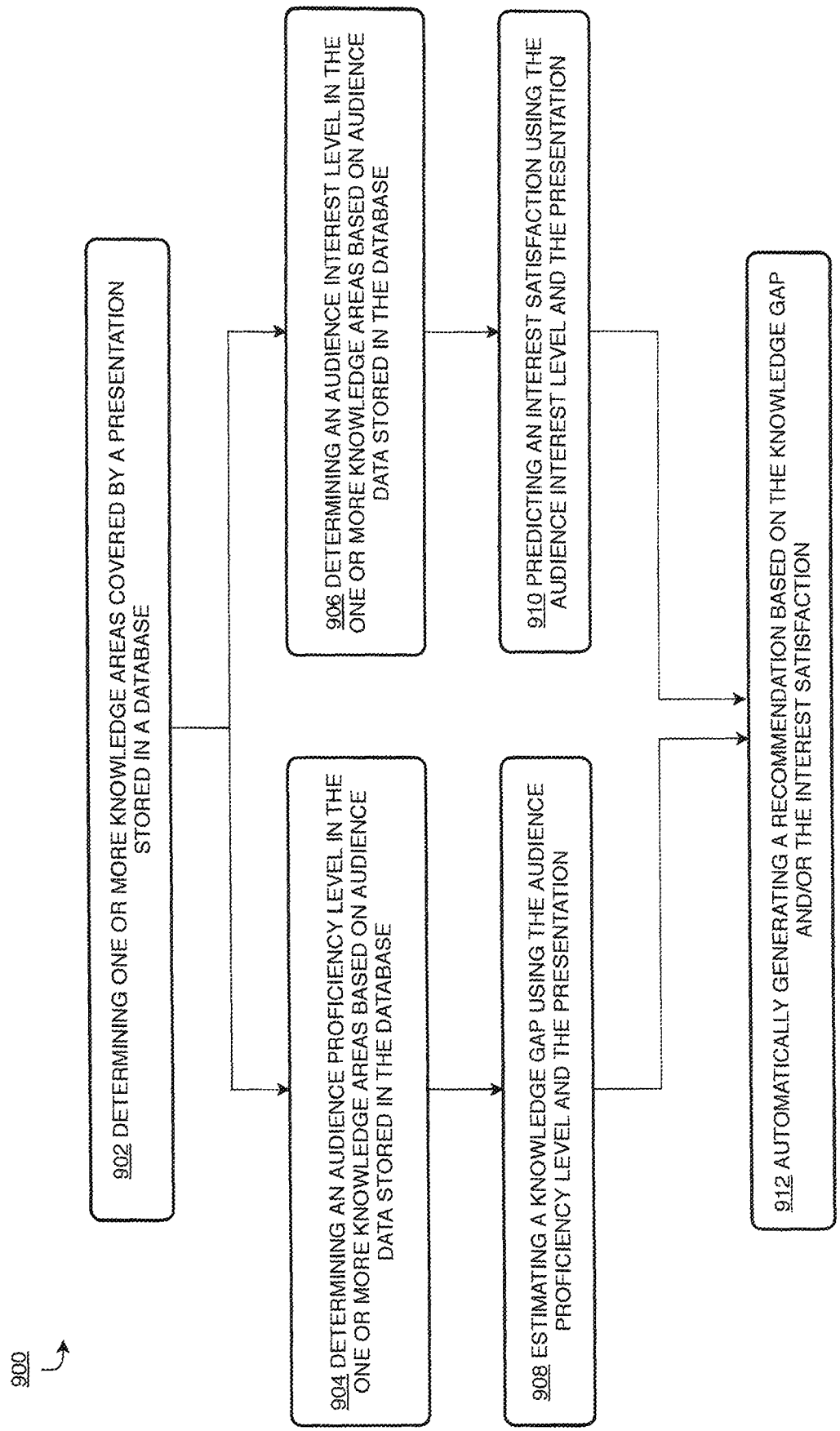
FIG. 9 illustrates a method or algorithm for evaluating presentation content against the composition of anticipated audiences, in an example embodiment.

FIG. 9 illustrates a method 900 for evaluating presentation content against the composition of anticipated audiences, in an example embodiment. The flow diagram of FIG. 9 showing a method 900, and each other flow diagram herein illustrates a method or plan that may be used as a basis for programming one or more of the functional modules using a programming development environment or programming language that is deemed suitable for the task. Thus, FIG. 9 is intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

At step 902, one or more knowledge areas covered by a presentation that is stored in an associated database is determined. For example, a slide presentation that is stored in a database 126 is evaluated to determine one or more knowledge areas that the presentation covers. In an embodiment, the content analysis instructions 202 evaluates a variety of inputs 302 related to a presentation. For example, the inputs 302 may be a title of a presentation 304, topics and/or subjects 306 of a presentation, tags and/or keywords 308 related to a presentation, a synopsis and/or description 310 of a presentation, agenda items and/or bullet points 312 of a presentation, a content list and/or hierarchical content tree 314 of a presentation's content, and/or a slide set 316 for a presentation. As an output, the content analysis instructions 202 generate a set 318 of knowledge area specifiers 320A, 320B, 320C. The knowledge area specifiers 320A, 320B, 320C are mapped to various components of the input. For example, a knowledge area specifier 320A, 320B, 320C can be mapped to a bullet point in a presentation slide set. These knowledge areas specifiers define the knowledge areas covered by the presentation.

At step 904, an audience proficiency level in the one or more knowledge areas is determined based on audience data stored in the database. For example, a list of registered attendees of a webinar that is stored in a database 126 is accessed. The audience analysis instructions 204 iterates through the names and/or registration information and conducts an evaluation of various audience members and/or the audience as a whole. For example, the audience analysis instructions 204 takes, as inputs, audience information, such as an audience member's profile 404 from various social media accounts, communication history 406 such as chat messages or emails sent, learned materials history 408 such as articles or books read, questions history 410 such as different types of questions that have been asked through a chat or email system, a comments history 412 such as comments that have been made via chat or email, and/or produced materials 414 such as written articles that have been produced. As an output, the audience analysis instructions 204 generate a set 416 of knowledge area specifiers 418A, 418B, 418C, each with quantifiers 420A, 420B, 420C representing audience proficiency levels in the particular knowledge areas.

At step 906, an audience interest level in the one or more knowledge areas is determined based on audience data stored in the database. In an embodiment, the audience analysis instructions 204 takes the same inputs as in step 906 and outputs a set 422 of interest area specifiers 424A, 424B, 424C, each with quantifiers 426A, 426B, 426C representing the audience interest levels in particular knowledge areas.

At step 908, a knowledge gap is estimated using the audience proficiency level and the presentation. For example, knowledge gap estimation instructions 206 take, as inputs, the set of knowledge area specifiers 320A, 320B, 320C determined at step 902 and the knowledge area specifiers 418A, 418B, 418C and associated quantifiers 420A, 420B, 420C determined at step 904. The knowledge gap estimation instructions 206 generates a set 502 of knowledge gap estimates 504A, 504B, 504C using the inputs.

At step 910, an interest satisfaction is predicted using the audience interest level and the presentation. For example, audience interest satisfaction prediction instructions 208 take, as input, the set of knowledge area specifiers 320A, 320B, 320C determined at step 902 and the interest area specifiers 424A, 424B, 424C and associated quantifiers 426A, 426B, 426C, which represent the audience interest levels. The audience interest satisfaction prediction instructions 208 generates a set 602 of interest satisfaction predictions 604A, 604B, 604C using the inputs.

At step 912, a recommendation is automatically generated based on the knowledge gap estimated during step 908 and/or the interest satisfaction predicted at step 910. The recommendation may be any form of feedback, notification, and/or automated remedial action produced by the presentation feedback instructions 210. For example, the presentation feedback instructions 210 generates a set 702 of scores that contribute to determining recommendations. In an embodiment, the presentation feedback instructions 210 generate overall aggregate scores 704, audience member aggregate scores 706, audience member detailed scores 708, knowledge area aggregate audience scores 710, and/or outlier scores 712. Each of these scores can be weighted based on certain factors, as previously described herein. As a result, the presentation feedback instructions 210 use these scores to determine recommendations and/or remedial actions 714 for presenters to take to improve their presentations. In some embodiments, the server system 120 automatically implements the recommendations.

In an embodiment, system tuning instructions 212 are used to tune the accuracy of the server system 120. For example, the system tuning instructions 212 take, as input, a set 802 of audience data, such as audience member surveys 804, audience member questions 806, and/or observed expressions and behaviors 808 of the audience members. Subsequently, the system tuning instructions 212 compares the set 802 of audience data to the knowledge gap estimates determined at step 908 and the set 602 of interest satisfaction predictions determined at step 910 in order to determine the accuracy of the knowledge gap estimates and/or interest satisfaction predictions and make adjustments where necessary.

In another embodiment, the server system 120 determines a presentation proficiency level for each of the one or more knowledge areas covered by a presentation that is stored in a database. In an example embodiment, the server system 120 uses the content analysis instructions 202 to generate knowledge area specifiers 320A, 320B, 320C for the content of the presentation stored in database 126, as previously described herein. The content analysis instructions 202 may also generate a presentation proficiency score or level for the presentation based on how detailed the presentation materials are in each of the knowledge areas. For example, presentation slides that feature complex and detailed descriptions in a particular knowledge area may have a high proficiency score or level associated with that knowledge area. Conversely, presentation slides that feature high-level and non-specific descriptions in a particular knowledge area may have a low proficiency score or level associated with that knowledge area. In some embodiments, the presentation proficiency level is a quantifier that describes the presentation materials' proficiency, expertise, and/or detailed coverage in the specific knowledge area(s). In some embodiments, the presentation proficiency score or level for each knowledge area may be aggregated into a total presentation proficiency level for the entire presentation rather than for each individual knowledge area.

In this example embodiment, the server system 120 then determines an anticipated audience based on audience data stored in the database and evaluates an audience proficiency level in the one or more knowledge areas. For example, the server system 120 may store a list of confirmed attendees of a future webinar in database 126, which the server system 120 will determine to be an anticipated audience. The server system 120 then uses the audience analysis instructions 204 to evaluate an audience proficiency in the knowledge areas based on the anticipated audience. For example, the audience analysis instructions 204 may evaluate each audience members of the anticipated audience based on various inputs 402, as previously discussed herein, and determine an audience member proficiency score or level in each of the knowledge areas. In some embodiments, the audience proficiency score or level may be quantifiers 420A, 420B, 420C that describe the audience member's proficiency, skill level, expertise, experience, and/or familiarity with the specific knowledge area(s). In an embodiment, the audience member proficiency levels may be aggregated into a total audience proficiency level for the entire audience, rather than for each individual audience member. The server system 120 then estimates a gap between the presentation proficiency level and the audience proficiency level. The server system 120 then automatically generates a recommendation based on the gap, as previously discussed herein.

What is claimed is:

1. A computer-implemented method for improving digital content recommendations of a presentation, the method comprising:
    determining one or more knowledge areas covered by the presentation stored in a database by applying machine learning to the presentation;
    determining an audience proficiency level in the one or more knowledge areas based on audience data stored in the database;
    estimating a predicted knowledge gap from the audience proficiency level and the presentation, wherein the predicted knowledge gap is a difference between a substance of content from the presentation and a substance of content associated with the audience proficiency level;
    automatically generating a content recommendation based, at least in part, on the predicted knowledge gap to fill gaps associated with the predicted knowledge gap;
    analyzing facial expressions of one or more participants of the presentation that determines a real knowledge gap within the presentation; and
    modifying a training data associated with the estimating the predicted knowledge gap based on the determined real knowledge gap as determined by analysis of the facial expressions, wherein the modified training data is used in estimating a subsequent predicted knowledge gap in a subsequent presentation associated with the one or more participants.

2. The computer-implemented method of claim 1, wherein determining the one or more knowledge areas comprises evaluating a title, a topic, a keyword, a description, a bullet point, a content list, or a digital slide set.

3. The computer-implemented method of claim 1, wherein determining the audience proficiency level in the one or more knowledge areas comprises evaluating a profile, a communication history, a learned materials history, a questions history, a comments history, or a produced material.

4. The computer-implemented method of claim 3, wherein the communication history comprises data from a chat environment.

5. The computer-implemented method of claim 1, wherein generating the recommendation comprises calculating an overall aggregate score, an audience member aggregate score, an audience member detailed score, a knowledge area aggregate audience score, or an outlier score.

6. The computer-implemented method of claim 1, wherein the recommendation comprises automatically increasing content details or decreasing content details.

7. The computer-implemented method of claim 1, wherein the recommendation comprises automatically changing an audience member.

8. The computer-implemented method of claim 1, further comprising:
    determining an audience interest level in the one or more knowledge areas based on the audience data stored in the database;
    predicting an interest satisfaction using the audience interest level and the presentation; and
    automatically generating a recommendation based, at least in part, on the interest satisfaction.

9. The computer-implemented method of claim 8, wherein determining the audience interest level in the one or more knowledge areas comprises evaluating a profile, a communication history, a learned materials history, a questions history, a comments history, or a produced material.

10. The computer-implemented method of claim 1 further comprising generating a recommendation to modify the composition of the audience based on the predicted knowledge gap.

11. The computer-implemented method of claim 1, wherein the determining one or more knowledge areas covered by the presentation comprises extrapolating a range of knowledge area that will be covered by the presentation.

12. The computer-implemented method of claim 1, wherein the audience proficiency level is determined based on one or more constructed personas, archetypes, aggregations or classes of audience members.

13. A non-transitory computer-readable medium storing a set of instructions that, when executed by a processor, cause:
    determining one or more knowledge areas covered by a presentation stored in a database by applying machine learning to the presentation;
    determining an audience proficiency level in the one or more knowledge areas based on audience data stored in the database;
    estimating a predicted knowledge gap from the audience proficiency level and the presentation, wherein the predicted knowledge gap is a difference between a substance of content from the presentation and a substance of content associated with the audience proficiency level;
    automatically generating a content recommendation based on the predicted knowledge gap to fill gaps associated with the predicted knowledge gap;
    analyzing facial expressions of one or more participants of the presentation that determines a real knowledge gap within the presentation; and
    modifying a training data associated with the estimating the predicted knowledge gap based on the determined real knowledge gap as determined by analysis of the facial expressions, wherein the modified training data is used in estimating a subsequent predicted knowledge gap in a subsequent presentation associated with the one or more participants.

14. The non-transitory computer-readable medium of claim 13, wherein determining the one or more knowledge areas comprises evaluating a title, a topic, a keyword, a description, a bullet point, a content list, or a digital slide set.

15. The non-transitory computer-readable medium of claim 13, wherein determining the audience proficiency level in the one or more knowledge areas comprises evaluating a profile, a communication history, a learned materials history, a questions history, a comments history, or a produced material.

16. The non-transitory computer-readable medium of claim 13, wherein generating the recommendation comprises calculating an overall aggregate score, an audience member aggregate score, an audience member detailed score, a knowledge area aggregate audience score, or an outlier score.

17. The non-transitory computer-readable medium of claim 13, further comprising:
  determining an audience interest level in the one or more knowledge areas based on the audience data stored in the database;
  predicting an interest satisfaction using the audience interest level and the presentation; and
  automatically generating a recommendation based, at least in part, on the interest satisfaction.

18. The computer-implemented method of claim 17, wherein determining the audience interest level in the one or more knowledge areas comprises evaluating a profile, a communication history, a learned materials history, a questions history, a comments history, or a produced material.

19. A system for improving digital content recommendations for a presentation, the system comprising:
  a processor;
  a memory operatively connected to the processor and storing instructions that, when executed by the processor, cause:
    determining one or more knowledge areas covered by the presentation stored in a database by applying machine learning to the presentation;
    determining an audience proficiency level in the one or more knowledge areas based on audience data stored in the database;
    estimating a predicted knowledge gap from the audience proficiency level and the presentation, wherein the predicted knowledge gap is a difference between a substance of content from the presentation and a substance of content associated with the audience proficiency level;
    automatically generating a content recommendation based on the predicted knowledge gap to fill gaps associated with the predicted knowledge gap;
    analyzing facial expressions of one or more participants of the presentation that determines a real knowledge gap within the presentation; and
    modifying a training data associated with the estimating the predicted knowledge gap based on the determined real knowledge gap as determined by analysis of the facial expressions, wherein the modified training data is used in estimating a subsequent predicted knowledge gap in a subsequent presentation associated with the one or more participants.

20. The system of claim 19, wherein determining the one or more knowledge areas comprises evaluating a title, a topic, a keyword, a description, a bullet point, a content list, or a digital slide set.

21. The system of claim 19, wherein determining the audience proficiency level in the one or more knowledge areas comprises evaluating a profile, a communication history, a learned materials history, a questions history, a comments history, or a produced material.

22. The system of claim 19, wherein generating the recommendation comprises calculating an overall aggregate score, an audience member aggregate score, an audience member detailed score, a knowledge area aggregate audience score, or an outlier score.

23. The system of claim 19, wherein the memory stores additional instructions that, when executed by the processor, further cause:
  determining an audience interest level in the one or more knowledge areas based on the audience data stored in the database;
  predicting an interest satisfaction using the audience interest level and the presentation; and
  automatically generating a recommendation based, at least in part, on the interest satisfaction.

24. The system of claim 23, wherein determining the audience interest level in the one or more knowledge areas comprises evaluating a profile, a communication history, a learned materials history, a questions history, a comments history, or a produced material.

* * * * *